United States Patent
Shudo

(10) Patent No.: US 8,173,736 B2
(45) Date of Patent: May 8, 2012

(54) ADDITION CURABLE LIQUID SILICONE RUBBER COMPOSITION FOR INJECTION MOLDING, METHOD OF REGULATING FLUIDITY OF THE COMPOSITION, AND METHOD OF INJECTION MOLDING SILICONE RUBBER COMPOSITION

(75) Inventor: Shigeki Shudo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1084 days.

(21) Appl. No.: 11/558,681

(22) Filed: Nov. 10, 2006

(65) Prior Publication Data

US 2007/0112148 A1    May 17, 2007

(30) Foreign Application Priority Data

Nov. 11, 2005  (JP) ................................. 2005-328100

(51) Int. Cl.
  *C08K 3/36* (2006.01)
(52) U.S. Cl. ....................................... 524/492; 524/588
(58) Field of Classification Search .................. 524/492, 524/588
  See application file for complete search history.

(56) References Cited

U.S. PATENT DOCUMENTS

| | | | | |
|---|---|---|---|---|
| 5,521,245 A | * | 5/1996 | Hirabayashi et al. | 524/493 |
| 5,563,211 A | * | 10/1996 | Kosal et al. | 524/731 |
| 5,880,245 A | * | 3/1999 | Fujita et al. | 528/27 |
| 5,942,332 A | * | 8/1999 | Nakamura et al. | 428/447 |
| 5,989,719 A | * | 11/1999 | Loiselle | 428/447 |
| 6,040,366 A | * | 3/2000 | Burkus et al. | 524/99 |
| 6,054,518 A | * | 4/2000 | Hayashida | 524/310 |
| 6,740,405 B2 | * | 5/2004 | Shudo | 428/391 |
| 6,761,673 B2 | | 7/2004 | Shudo | |
| 6,783,858 B2 | * | 8/2004 | Ziebell | 428/413 |

FOREIGN PATENT DOCUMENTS

| | | |
|---|---|---|
| EP | 0 579 494 A1 | 1/1994 |
| EP | 0 601 881 A1 | 6/1994 |
| EP | 0 622 421 A2 | 11/1994 |
| EP | 0 839 869 A2 | 5/1998 |
| EP | 1 225 210 A2 | 7/2002 |
| EP | 1 361 253 A1 | 11/2003 |
| JP | 04-236265 | 8/1992 |
| JP | 08-151521 | 6/1996 |
| JP | 9-124945 | 5/1997 |
| JP | 10-130504 | 5/1998 |

* cited by examiner

*Primary Examiner* — Margaret Moore

(74) *Attorney, Agent, or Firm* — Oblon, Spivak, McClelland, Maier & Neustadt, L.L.P.

(57) ABSTRACT

An addition curable liquid silicone rubber composition for injection molding is provided. The composition comprises (A) an organopolysiloxane containing at least two Si-bonded alkenyl groups within each molecule, (B) an organohydrogenpolysiloxane containing at least two Si-bonded hydrogen atoms within each molecule, (C) a fumed silica with a BET specific surface area of 50 m$^2$/g or greater, and (D) an addition reaction catalyst, and exhibiting fluidity such that, at 23° C., the viscosity at a shear velocity of 0.9 s$^{-1}$ is not higher than 1,000 Pa·s, and the ratio between the viscosity at a shear velocity of 100 s$^{-1}$ and the viscosity at a shear velocity of 200 s$^{-1}$ is not higher than 3.5. The composition is resistant to decreases in viscosity of the rubber material under high shear velocity, and generates no burrs on the molded product.

17 Claims, No Drawings

ADDITION CURABLE LIQUID SILICONE RUBBER COMPOSITION FOR INJECTION MOLDING, METHOD OF REGULATING FLUIDITY OF THE COMPOSITION, AND METHOD OF INJECTION MOLDING SILICONE RUBBER COMPOSITION

BACKGROUND OF THE INVENTION

1. Field of the Invention

The present invention relates to a silicone rubber composition that comprises an organopolysiloxane and undergoes curing via an addition reaction to generate a silicone rubber, and more specifically, relates to an addition curable liquid silicone rubber composition which, even when used to produce cured molded products by injection molding, generates no burrs on the molded product, as well as a method of regulating the fluidity of such a composition, and a method of injection molding a silicone rubber composition.

2. Description of the Prior Art

Silicone rubbers exhibit excellent levels of heat resistance and cold resistance, and superior electrical properties and the like, and are consequently used as rubber molded products in a wide variety of applications. In recent years, a method known as burr-free or runnerless molding has become increasingly widespread in the injection molding of addition curable liquid silicone rubbers. This is a molding method in which no wasted cured product is produced, and in which secondary processing is unnecessary, namely, a method in which no sprue or runners exist (or even if they do exist, the liquid silicone rubber does not cure), meaning the generation of burrs is minimized. This molding method has significant benefits, including enabling automation of the injection molding, shortening of the molding cycle, and a reduction in the cost of the molded products. With this molding method, in addition to the required mechanical specifications such as the precision of the mold construction and the mold parting surface, and the precision with which the injection molding device measures and discharges the rubber composition, a rubber material that is resistant to burr generation must also be used.

The rubber material injected into the cavity undergoes a reduction in viscosity under high shear velocity, and can then flow into gaps within the mold and generate burrs on curing. One technique for preventing the generation of these burrs is a method in which the viscosity of the rubber material is increased. However in injection molding, a material pump is usually used to supply the rubber material to the injection unit of the injection molding device, and if the viscosity of the rubber material is high, then a practical problem arises in that the supply process using the material pump takes considerable time.

SUMMARY OF THE INVENTION

Accordingly, the present invention has an object of providing an addition curable liquid silicone rubber composition for injection molding, which is resistant to decreases in viscosity of the rubber material under high shear velocity, and generates no burrs on the molded product, as well as a method of regulating the fluidity of the composition, and a method of injection molding a silicone rubber composition.

A first aspect of the present invention provides an addition curable liquid silicone rubber composition for injection molding, comprising:

(A) 100 parts by mass of an organopolysiloxane containing at least two alkenyl groups bonded to silicon atoms within each molecule, (B) an organohydrogenpolysiloxane containing at least two hydrogen atoms bonded to silicon atoms within each molecule, in sufficient quantity to provide from 0.4 to 5.0 hydrogen atoms bonded to silicon atoms within the component (B) for each alkenyl group bonded to a silicon atom within the component (A), (C) from 10 to 40 parts by mass of a fumed silica with a specific surface area measured by a BET method of 50 $m^2/g$ or greater, and (D) an effective quantity of an addition reaction catalyst, and exhibiting fluidity such that, at 23° C., the viscosity at a shear velocity of 0.9 $s^{-1}$ is not higher than 1,000 Pa·s, and the ratio between the viscosity at a shear velocity of 100 $s^{-1}$ and the viscosity at a shear velocity of 200 $s^{-1}$ is not higher than 3.5.

A preferred embodiment of the addition curable liquid silicone rubber composition for injection molding described above further comprises, as a fluidity regulator, (E) from 0.1 to 10 parts by mass of a straight-chain diorganopolysiloxane containing at least one hydroxyl group bonded to a silicon atom within each molecule, with a viscosity at 25° C. within a range from 0.001 to 3 Pa·s, and a hydroxyl number within a range from $1.0 \times 10^{-2}$ to $7.7 \times 10^{-5}$ mol/g.

In a preferred embodiment of the addition curable liquid silicone rubber composition for injection molding described above, the ratio of hydroxyl groups within the hydroxyl group-containing straight-chain diorganopolysiloxane of the component (E), relative to the total surface area of the fumed silica of the component (C), is within a range from $6.4 \times 10^{-9}$ to $2.0 \times 10^{-1}$ mol/$m^2$.

A second aspect of the present invention provides a method of regulating fluidity of an addition curable liquid silicone rubber composition for injection molding, comprising:

adding (E) from 0.1 to 10 parts by mass of a straight-chain diorganopolysiloxane containing at least one hydroxyl group bonded to a silicon atom within each molecule, with a viscosity at 25° C. within a range from 0.001 to 3 Pa·s, and a hydroxyl number within a range from $1.0 \times 10^{-2}$ to $7.7 \times 10^{-1}$ mol/g, to a composition comprising:

(A) 100 parts by mass of an organopolysiloxane containing at least two alkenyl groups bonded to silicon atoms within each molecule, (B) an organohydrogenpolysiloxane containing at least two hydrogen atoms bonded to silicon atoms within each molecule, in sufficient quantity to provide from 0.4 to 5.0 hydrogen atoms bonded to silicon atoms within said component (B) for each alkenyl group bonded to a silicon atom within said component (A), (C) from 10 to 40 parts by mass of a fumed silica with a specific surface area measured by a BET method of 50 $m^2/g$ or greater, and (D) an effective quantity of an addition reaction catalyst, thereby yielding a composition having fluidity such that, at 23° C., a viscosity at a shear velocity of 0.9 $s^{-1}$ is not higher than 1,000 Pa·s, and a ratio between a viscosity at a shear velocity of 100 $s^{-1}$ and a viscosity at a shear velocity of 200 $s^{-1}$ is not higher than 3.5.

In a preferred embodiment of the method of regulating fluidity described above, the ratio of hydroxyl groups within the hydroxyl group-containing straight-chain diorganopolysiloxane of the component (E), relative to the total surface area of the fumed silica of the component (C), is within a range from $6.4 \times 10^{-9}$ to $2.0 \times 10^{-6}$ mol/$m^2$.

A third aspect of the present invention provides a method of injection molding a silicone rubber composition, wherein injection molding is conducted using the addition curable liquid silicone rubber composition for injection molding described above.

By using an addition curable liquid silicone rubber composition of the present invention in an injection molding process, the resulting molded products (that is, the cured products) contain no burrs. Accordingly, the composition can contribute to improvements in productivity, including automation of the injection molding of the addition curable liquid silicone rubber composition, shortening of the molding cycle, and a reduction in the cost of the molded products.

DETAIL OF THE PREFERRED EMBODIMENTS

A composition of the present invention comprises the components (A) through (D) described above. First is a detailed description of each of these components.

<(A) Organopolysiloxane Containing Silicon Atom-Bonded Alkenyl Groups>

The component (A) included in a composition of the present invention is an that comprises at least two, and preferably from 2 to 50, and even more preferably from 2 to 20, alkenyl groups bonded to silicon atoms within each molecule. The component (A) is usually a known organopolysiloxane that is used as the base polymer in conventional addition curable silicone rubbers.

The viscosity of the component (A) at 25° C. is typically within a range from 0.1 to 100 Pa·s, and is preferably from 0.5 to 100 Pa·s, and even more preferably from 1 to 100 Pa·s. Provided this viscosity satisfies this range, the mechanical strength of the molded item (the cured product) is favorable, and the viscosity of the composition is also appropriate, meaning the supply time using the material pump can be shortened.

The molecular structure of the component (A) may be a straight-chain structure, a branched-chain structure or a straight-chain structure with partial branching, although a straight-chain structure that contains no hydroxyl groups within the molecule is preferred. The alkenyl groups bonded to silicon atoms within the component (A) may be bonded to the silicon atoms at the molecular chain terminals, to non-terminal silicon atoms within the molecular chain, or to both these types of silicon atoms, although structures in which alkenyl groups are bonded to at least the silicon atoms at both molecular chain terminals are preferred.

The component (A) is typically represented by an average composition formula (1) shown below.

$$R_aSiO_{(4-a)/2} \quad (1)$$

(wherein, each R represents, independently, an unsubstituted or substituted monovalent hydrocarbon group, and a represents a number within a range from 1.9 to 2.4, and preferably from 1.95 to 2.05)

In the above average composition formula (1), the unsubstituted or substituted monovalent hydrocarbon group represented by R is typically a group of 1 to 10, and preferably 1 to 8, carbon atoms, and specific examples of suitable groups include unsubstituted monovalent hydrocarbon groups, including alkyl groups such as a methyl group, ethyl group, propyl group, isopropyl group, butyl group, isobutyl group, tert-butyl group, hexyl group, or cyclohexyl group; alkenyl groups such as a vinyl group, allyl group, propenyl group, isopropenyl group, or butenyl group; aryl groups such as a phenyl group, tolyl group, or xylyl group; and aralkyl groups such as a benzyl group; as well as substituted monovalent hydrocarbon groups in which at least a portion of the hydrogen atoms within the above unsubstituted monovalent hydrocarbon groups have been substituted with a halogen atom or a cyano group or the like, including a 3,3,3-trifluoropropyl group or cyanoethyl group or the like. Of these, vinyl groups are preferred as the alkenyl groups, and the remaining groups bonded to silicon atoms are preferably methyl groups and/or phenyl groups.

An organopolysiloxane represented by the above average composition formula (1) may be either a straight-chain structure, or a branched-chain structure containing siloxane units represented by the formula: $RSiO_{3/2}$ (wherein, R is as defined above, and this also applies below), and/or siloxane units represented by the formula: $SiO_{4/2}$, but usually straight-chain diorganopolysiloxanes in which the principal chain comprises repeating diorganosiloxane units (namely, siloxane units represented by the formula: $R_2SiO_{2/2}$) and both molecular chain terminals are blocked with triorganosiloxy groups (namely, siloxane units represented by the formula: $R_3SiO_{1/2}$) are preferred.

The component (A) can be produced by those skilled in the art using conventional methods. For example, the component (A) can be obtained by subjecting an organocyclopolysiloxane that corresponds with the desired molecular structure and a hexaorganodisiloxane to an equilibration reaction in the presence of an alkali or acid catalyst.

Specific examples of the component (A) include the compounds shown below.

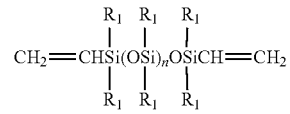

(wherein, n is either 0 or an integer of 1 or greater, which is selected so as to satisfy the above viscosity range, and $R_1$ is a group as defined above for R but excluding the alkenyl groups (and this definition also applies below))

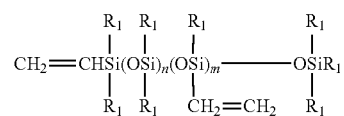

(wherein, n is either 0 or an integer of 1 or greater, m is an integer of 1 or greater, and n+m is a number that satisfies the above viscosity range)

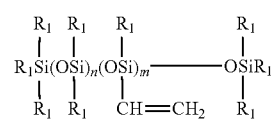

(wherein, n is either 0 or an integer of 1 or greater, m is an integer of 1 or greater, and n+m is a number that satisfies the above viscosity range)

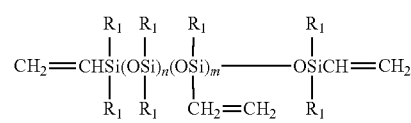

(wherein, n is either 0 or an integer of 1 or greater, m is an integer of 1 or greater, and
n+m is a number that satisfies the above viscosity range)

These compounds may be used either alone, or in combinations of two or more different compounds.

The organopolysiloxane of the component (A) may use either a single compound, or a combination of two or more different compounds.

<(B) Organohydrogenpolysiloxane Containing Silicon Atom-bonded Hydrogen Atoms>

The component (B) included in a composition of the present invention is an organohydrogenpolysiloxane that contains at least two (typically from 2 to 200), preferably three or more (for example, from 3 to 100), and even more preferably from 3 to 50, hydrogen atoms bonded to silicon atoms (namely, SiH groups) within each molecule. The organohydrogenpolysiloxane of the component (B) functions as a cross-linking agent within an addition reaction between the alkenyl groups within the organopolysiloxane of the component (A) and the hydrogen atoms bonded to silicon atoms within the component (B) (in other words, a hydrosilylation reaction). The component (B) preferably contains no hydroxyl groups or aliphatic unsaturated bonds within the molecule.

There are no particular restrictions on the molecular structure of the component (B), and straight-chain, cyclic, branched, or three dimensional network structures are all acceptable, although a straight-chain, branched, and/or cyclic structure is preferred. The hydrogen atoms bonded to silicon atoms within the component (B) may be bonded to the silicon atoms at the molecular chain terminals, to non-terminal silicon atoms within the molecular chain, or to both these types of silicon atoms.

The viscosity of the component (B) at 25° C. is typically within a range from 0.0001 to 5 Pa·s, and is preferably from 0.0005 to 1 Pa·s, and even more preferably from 0.005 to 0.5 Pa·s, and the number of silicon atoms within each molecule (or the polymerization degree) is typically within a range from 2 to 200, preferably from 2 to 100, and even more preferably from 3 to 50.

The component (B) is typically represented by an average composition formula (2) shown below.

$$R_b H_c SiO_{(4-b-c)/2} \quad (2)$$

(wherein, each R represents, independently, an unsubstituted or substituted monovalent hydrocarbon group, b represents a number from 0.7 to 2.1, c represents a number from 0.001 to 1.0, and b+c represents a number within a range from 0.8 to 3)

In the above average composition formula (2), the unsubstituted or substituted monovalent hydrocarbon group represented by R is as per the definition for the group R in the average composition formula (1). Specific examples of suitable groups include the same groups exemplified for the unsubstituted or substituted monovalent hydrocarbon group represented by R in the average composition formula (1). Of these, groups that contain no aliphatic unsaturated bonds such as alkenyl groups are preferred, and methyl groups and/or phenyl groups are particularly desirable.

In the above average composition formula (2), b is preferably a number from 0.8 to 2.0, c is preferably a number from 0.01 to 1.0, and b+c is preferably a number within a range from 1.0 to 2.5.

Specific examples of the component (B) include siloxane oligomers such as tris(dimethylhydrogensiloxy)methylsilane, tris(dimethylhydrogensiloxy)phenylsilane, 1,1,3,3-tetramethyldisiloxane, 1,3,5,7-tetramethyltetracyclosiloxane, and 1,3,5,7,9-pentamethylpentacyclosiloxane; methylhydrogenpolysiloxane with both molecular chain terminals blocked with trimethylsiloxy groups, copolymers of dimethylsiloxane and methylhydrogensiloxane with both molecular chain terminals blocked with trimethylsiloxy groups, methylhydrogenpolysiloxane with both molecular chain terminals blocked with silanol groups, copolymers of dimethylsiloxane and methylhydrogensiloxane with both molecular chain terminals blocked with silanol groups, dimethylpolysiloxane with both molecular chain terminals blocked with dimethylhydrogensiloxy groups, methylhydrogenpolysiloxane with both molecular chain terminals blocked with dimethylhydrogensiloxy groups, copolymers of dimethylsiloxane and methylhydrogensiloxane with both molecular chain terminals blocked with dimethylhydrogensiloxy groups; as well as silicone resins comprising $R_2(H)SiO_{1/2}$ units and $SiO_{4/2}$ units, and optionally comprising $R_3SiO_{1/2}$ units, $R_2SiO_{2/2}$ units, $R(H)SiO_{2/2}$ units, $(H)SiO_{3/2}$ units, or $RSiO_{3/2}$ units (wherein, R is as defined above), or a combination of these optional units, and compounds in which either a portion of, or all of, the methyl groups within the above compounds have been substituted with other alkyl groups such as ethyl groups or propyl groups, or with aryl groups such as phenyl groups.

The organohydrogenpolysiloxane of the component (B) can be obtained using known production methods. In one typical production method, the organohydrogenpolysiloxane can be obtained with relative ease by subjecting octamethylcyclotetrasiloxane and/or tetramethylcyclotetrasiloxane, together with hexamethyldisiloxane and/or 1,3-dihydro-1,1,3,3-tetramethyldisiloxane for generating the terminal groups, to an equilibration reaction in the presence of a catalyst such as sulfuric acid, trifluoromethanesulfonic acid or methanesulfonic acid, and at a temperature of approximately −10 to +40° C.

The blend quantity of the component (B) must be sufficient to provide from 0.4 to 5.0, and preferably from 0.8 to 3.0, hydrogen atoms bonded to silicon atoms within the component (B) for each alkenyl group within the component (A). If this blend quantity provides less than 0.4 hydrogen atoms, then the cross-linking density may become overly low, which can have adverse effects on the heat resistance of the injection molded item (the cured product), whereas if the blend quantity provides more than 5.0 hydrogen atoms, then not only does foaming caused by a dehydrogenation reaction become problematic, but the heat resistance may also be adversely affected. The organohydrogenpolysiloxane of the component (B) may use either a single compound, or a combination of two or more different compounds.

<(C) Fumed Silica>

The component (C) included in a composition of the present invention is a fumed silica with a specific surface area measured by a BET method of 50 m²/g or greater. The fumed silica of the component (C) is essential for imparting adequate strength to the silicone rubber.

The specific surface area measured by a BET method is preferably within a range from 100 to 400 m²/g, and even more preferably from 150 to 350 m²/g. If this specific surface area measured by a BET method is less than 50 m²/g, then sufficient strength may not be attainable, and the transparency of the molded product may also deteriorate, whereas if the specific surface area is too large, there is a danger that blending of the component will become very difficult.

The fumed silica of the component (C) may be used as is, in an untreated form, but is preferably subjected to hydrophobic surface treatment. In those cases where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane of the component (A), so that the fumed silica is treated in-situ.

The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The blend quantity of the component (C) must fall within a range from 10 to 40 parts by mass, and is preferably from 15 to 35 parts by mass, per 100 parts by mass of the component (A). If this blend quantity is less than 10 parts by mass, then adequate rubber strength may not be obtainable, whereas if the blend quantity exceeds 40 parts by mass, the actual blending process may become difficult. The fumed silica of the component (C) may use either a single material, or a combination of two or more different materials.

<(D) Addition Reaction Catalyst>

The component (D) included in a composition of the present invention is an addition reaction catalyst. Examples of the addition reaction catalyst of the component (D) include platinum-based catalysts such as platinum black, platinic chloride, chloroplatinic acid, reaction products of chloroplatinic acid and monovalent alcohols, complexes of chloroplatinic acid and olefins, and platinum bisacetoacetate; as well as other platinum group metal compounds such as palladium-based catalysts and rhodium-based catalysts.

There are no particular restrictions on the blend quantity of the component (D), which need only be sufficient to provide an effective catalytic action in accelerating the addition reaction between the alkenyl groups within the component (A) and the hydrogen atoms bonded to silicon atoms within the component (B) (in other words, the hydrosilylation reaction), although a typical quantity, expressed as a mass-referenced quantity of the platinum group metal, is within a range from 0.5 to 1,000 ppm relative to the mass of the component (A), and blend quantities from approximately 1 to 200 ppm are particularly desirable. The addition reaction catalyst of the component (D) may use either a single material, or a combination of two or more different materials.

<(E) Fluidity Regulator>

In order to ensure the ideal viscosity and fluidity for achieving favorable productivity and burr suppression within the injection molding process described below, the composition comprising the components (A) through (D) may also optionally include, where required, (E) a fluidity regulator comprising a straight-chain organopolysiloxane containing at least one hydroxyl group bonded to a silicon atom (namely, a silanol group) within each molecule, with a viscosity at 25° C. that typically falls within a range from 0.001 to 3 Pa·s, and is preferably from 0.001 to 1 Pa·s, and even more preferably from 0.001 to 0.7 Pa·s, and a hydroxyl number that typically falls within a range from $1.0 \times 10^{-2}$ to $7.7 \times 10^{-5}$ mol/g, and is preferably from $1.0 \times 10^{-2}$ to $9.5 \times 10^{-5}$ mol/g, and even more preferably from $1.0 \times 10^{-2}$ to $10.3 \times 10^{-5}$ mol/g. This hydroxyl group-containing straight-chain organopolysiloxane that functions as a fluidity regulator contains no functional groups within the molecule such as alkenyl groups and/or SiH groups that are capable of contributing to the hydrosilylation addition reaction, and although the hydroxyl groups within the molecule may be bonded to the silicon atoms at the molecular chain terminals, to non-terminal silicon atoms (within the molecular chain), or to both these types of silicon atoms, straight-chain organopolysiloxanes containing hydroxyl groups bonded to the silicon atoms at both molecular chain terminals (in other words, α,ω-dihydroxydiorganopolysiloxanes) are preferred. Examples of the organic groups bonded to the silicon atoms within these structures include monovalent hydrocarbon groups including alkyl groups such as methyl groups, ethyl groups and propyl groups, and aryl groups such as phenyl groups, and structures in which the repeating diorganosiloxane units that constitute the principal chain of the organopolysiloxane are one or more of dimethylsiloxane units, diphenylsiloxane units, and methylphenylsiloxane units are particularly preferred. Specific examples include α,ω-dihydroxydimethylpolysiloxane, α,ω-dihydroxydiphenylpolysiloxane, α,ω-dihydroxymethylphenylpolysiloxane, α,ω-dihydroxy(dimethylsiloxane-diphenylsiloxane) copolymers, and α,ω-dihydroxy (dimethylsiloxane-methylphenylsiloxane) copolymers.

The component (E) is an optional component that is added according to need, and the blend quantity is typically within a range from 0 to 10 parts by mass, preferably from 0.1 to 5 parts by mass, and even more preferably from approximately 0.5 to 3 parts by mass, per 100 parts by mass of the component (A). Furthermore, the blend quantity of the component (E) may also be set so that the ratio of hydroxyl groups within the component (E) relative to the total surface area of the fumed silica added to the composition is typically within a range from $6.4 \times 10^{-9}$ to $2.0 \times 10^{-6}$ mol/m$^2$, and is preferably from $1.5 \times 10^{-8}$ to $1.8 \times 10^{-6}$ mol/m$^2$, even more preferably from $2.0 \times 10^{-8}$ to $1.7 \times 10^{-6}$ mol/m$^2$, and is most preferably from $4.0 \times 10^{-8}$ to $1.7 \times 10^{-6}$ mol/m$^2$.

<Other Components>

Other components besides the aforementioned components (A) through (D) may also be added to a composition of the present invention according to need, provided such addition does not impair the external appearance of the injection molded item. Specific examples of these other components include fillers such as precipitated silica, quartz powder, diatomaceous earth, and calcium carbonate; conductive agents such as carbon black, conductive zinc oxide, and metal powders; hydrosilylation reaction retarders such as nitrogen-containing compounds, acetylene compounds, phosphorus compounds, nitrile compounds, carboxylates, tin compounds, mercury compounds, and sulfur compounds; heat resistance agents such as iron oxide and cerium oxide; internal release agents such as dimethylsilicone oil; adhesion-imparting agents; and thixotropy-imparting agents. These components may use either a single compound, or a combination of two or more different compounds.

<Preparation and Curing Method>

A composition of the present invention can be prepared by uniformly mixing together the aforementioned components using a conventional mixing or kneading device such as a kneader or planetary mixer. A cured product can then be produced by curing the prepared composition. Curing can be conducted using similar curing conditions to those employed with conventional addition reaction curable silicone rubber compositions, and although many compositions will cure adequately at room temperature, heating may also be employed if necessary, and in such cases, heating is typically conducted at a temperature within a range from 80 to 220° C., and preferably from 120 to 200° C., for a period within a range from 3 seconds to 10 minutes, and preferably from 5 seconds to 3 minutes.

<Properties>

A composition of the present invention must have a viscosity at a shear velocity of 0.9 s$^{-1}$ that is not higher than 1,000 Pa·s at 23° C., and this viscosity is preferably within a range from 100 to 1,000 Pa·s, and even more preferably from 200 to 1,000 Pa·s. if this viscosity exceeds 1,000 Pa·s, then material supply takes considerable time during injection molding, which can cause a dramatic fall in productivity.

Furthermore, at 23° C., a composition of the present invention must exhibit a ratio between the viscosity at a shear velocity of 100 s$^{-1}$ and the viscosity at a shear velocity of 200 s$^{-1}$ (namely, the ratio of the viscosity at a shear velocity of 200 s$^{-1}$ relative to the viscosity at a shear velocity of 100 s$^{-1}$) that is not higher than 3.5, and this ratio is preferably within a range from 1.0 to 3.5, and even more preferably from 1.5 to 3.5. If this viscosity ratio exceeds 3.5, then burrs tend to develop on the produced molded item, meaning a burr removal operation becomes necessary, which lowers the productivity and increase the production cost of the molded item. Moreover, in the case of two-color injection molding using two separate silicone rubbers, if burrs are generated on the silicone rubber molded item produced by the primary injection molding, then these burrs can generate molding irregularities during molding of the second silicone rubber during the secondary injection molding.

Measurement of the viscosity at these specific shear velocities can be conducted, for example, using a high-precision rotational viscometer (manufactured by Haake Corporation).

<Applications>

As a result of their superior levels of external appearance and safety, molded items obtained by injection molding of a composition of the present invention can be used favorably within products for infants, including toys, plates or utensils, tooth brushes, teats for baby bottles, and baby pacifiers; and within diving and swimming items such as swimming goggles, goggle straps, and snorkels.

<Injection Molding>

A composition of the present invention is used for preparing injection molded items (namely, cured products) by injection molding. Specifically, the injection molded items are prepared by a method comprising the steps of:
(i) filling a mold by injecting the above composition into the mold cavity (hereafter referred to as "step (i)"), and
(ii) curing the injected composition (hereafter referred to as "step (ii)"). These steps are usually conducted in an automated fashion, using an injection molding device fitted with an injection cylinder that houses a plunger or screw or the like. There are no particular restrictions on the injection molding devices that are suitable for use with a composition of the present invention, and plunger devices, screw-plunger devices, and screw inline devices are all suitable.

In the step (i), the temperature of the mold during injection-filling of the mold cavity with the above composition is typically within a range from 100 to 200° C., preferably from 120 to 200° C., and even more preferably from 150 to 200° C. Furthermore, in those cases where an injection molding device is used, the temperature inside the injection cylinder is typically within a range from 5 to 40° C., preferably from 5 to 30° C., and even more preferably from 10 to 30° C.

In the step (ii), in order to cure the injected composition, the composition may be left to stand at room temperature, although as described above, the composition is preferably heated at a temperature within a range from 80 to 220° C., and preferably from 120 to 200° C., for a period within a range from 3 seconds to 10 minutes, and preferably from 5 seconds to 3 minutes.

Next is a description of one example of injection molding using an injection molding device. The composition of the present invention is placed in a hopper. This composition inside the hopper is then supplied, via a supply section, to the interior of an injection cylinder fitted with a plunger or screw or the like. Subsequently, the plunger or screw or the like is used to move the composition inside the injection cylinder in the direction of the mold, thereby injecting the composition into the mold cavity (the step (i)). By subsequently heating the mold, the composition inside the mold cavity is heated and cured (the step (ii)). The cured product produced upon curing is then ejected from the mold using an ejector, enabling the injection molded item to be removed. By repeating this process, injection molded items can be produced in a continuous manner.

EXAMPLES

As follows is a description of specifics of the present invention using a series of examples and comparative examples, although the present invention is in no way limited by the examples presented below.

Example 1

90 parts by mass of a dimethylpolysiloxane with both molecular chain terminals blocked with dimethylvinylsiloxy groups and with a viscosity at 25° C. of 30 Pa·s (average polymerization degree: approximately 750) (component (A)), 40 parts by mass of a fumed silica with a BET specific surface area of 300 m$^2$/g (product name: Aerosil 300, manufactured by Nippon Aerosil Co., Ltd.), 8 parts by mass of hexamethyldisilazane, and 2 parts by mass of water were mixed together for 30 minutes at room temperature (25° C.), and the mixture was then heated to 150° C. with continued stirring for 3 hours, and then cooled, yielding a silicone rubber base.

To 130 parts by mass of this silicone rubber base was added 60 parts by mass of a dimethylpolysiloxane with both molecular chain terminals blocked with dimethylvinylsiloxy groups and with a viscosity at 25° C. of 100 Pa·s (average polymerization degree: approximately 1,000 (this value was determined from the polystyrene equivalent weight average molecular weight measured by GPC, this also applies to all subsequent polymerization degree values)) (component (A)), and following stirring for 30 minutes, 2.0 parts by mass of a methylhydrogenpolysiloxane containing SiH groups at both molecular chain terminals and non-terminal positions [viscosity at 25° C.: 0.011 Pa·s, polymerization degree: 20, SiH group content: 0.0050 mol/g] (component (B)) as a cross-linking agent [(SiH groups within the component (B))/(alkenyl groups bonded to silicon atoms within the total component (A))=2.2 mol/mol], 0.10 parts by mass of ethynylcyclohexanol as a reaction retarder, 0.1 parts by mass of a platinum catalyst (Pt concentration: 1% by mass), and 1 part by mass of an α,ω-dihydroxydimethylpolysiloxane with a viscosity at 25° C. of 0.01 Pa·s (hydroxyl number: 0.5×10$^{-2}$ mol/g) were added to the mixture, and stirring was continued for a further 15 minutes, thereby yielding a silicone rubber composition 1.

Using the cone and plate measurement jig of a high-precision rotational viscometer (manufactured by Haake Corporation), the viscosity of this silicone rubber composition 1 at 23° C. was measured at shear velocities of 0.9 s$^{-1}$, 100 s$^{-1}$, and 200 s$^{-1}$. The results are shown in Table 1.

In addition, the silicone rubber composition 1 was separated into two liquids, which were then placed in separate material pumps within a two-color injection molding device. Subsequently, using a mold that enabled the molding of four molded nipples, injection molding was conducted under the same conditions as those described above, thus preparing a series of molded nipple items (cured products). These molded nipple items were inspected for the presence of burrs. The results are shown in Table 1.

Example 2

With the exception of altering the quantity of the α,ω-dihydroxydimethylpolysiloxane with a viscosity at 25° C. of 0.01 Pa·s (hydroxyl number: 0.5×10$^{-2}$ mol/g) from the 1 part by mass used in the example 1 to 2 parts by mass, a silicone rubber composition 2 was prepared in the same manner as the example 1, and the viscosity of the composition was then measured, and an inspection was conducted for the presence of burrs within the molded nipple items in the same manner as the example 1. The results are shown in Table 1.

Comparative Example 1

With the exception of replacing the 1 part by mass of the α,ω-dihydroxydimethylpolysiloxane with a viscosity at 25° C. of 0.01 Pa·s used in the example 1 with 1 part by mass of an α,ω-dihydroxydimethylpolysiloxane with a viscosity at 25° C. of 5 Pa·s (hydroxyl number: 6.8×10$^{-5}$ mol/g), a silicone rubber composition 3 was prepared in the same manner as the example 1, and the viscosity of the composition was then measured, and an inspection was conducted for the presence of burrs within the molded nipple items in the same manner as the example 1. The results are shown in Table 1.

Comparative Example 2

With the exception of replacing the 1 part by mass of the α,ω-dihydroxydimethylpolysiloxane with a viscosity at 25° C. of 0.01 Pa·s used in the example 1 with 2 parts by mass of an α,ω-dihydroxydimethylpolysiloxane with a viscosity at 25° C. of 5 Pa·s (hydroxyl number: 6.8×10$^{-5}$ mol/g), a silicone rubber composition 4 was prepared in the same manner as the example 1, and the viscosity of the composition was then measured, and an inspection was conducted for the presence of burrs within the molded nipple items in the same manner as the example 1. The results are shown in Table 1.

TABLE 1

|  | Example 1 | Example 2 | Comparative example 1 | Comparative example 2 |
|---|---|---|---|---|
| Viscosity (Pa · s) at shear velocity of 0.9 s$^{-1}$ | 430 | 470 | 390 | 342 |
| Viscosity (Pa · s) at shear velocity of 100 s$^{-1}$ | 78 | 56 | 52 | 60 |
| Viscosity (Pa · s) at shear velocity of 200 s$^{-1}$ | 37 | 18 | 14 | 11 |
| Ratio between viscosity at shear velocity of 100 s$^{-1}$ and viscosity at shear velocity of 200 s$^{-1}$ | 2.1 | 3.1 | 3.7 | 5.5 |
| Presence of burrs on molded nipple items | No | No | Yes | Yes |

Comparative Example 3

90 parts by mass of a dimethylpolysiloxane with both molecular chain terminals blocked with dimethylvinylsiloxy groups and with a viscosity at 25° C. of 30 Pa·s (average polymerization degree: approximately 750) (component (A)), 40 parts by mass of a fumed silica with a BET specific surface area of 300 m$^2$/g (product name: Aerosil 300, manufactured by Nippon Aerosil Co., Ltd.), 8 parts by mass of hexamethyldisilazane, and 2 parts by mass of water were mixed together for 30 minutes at room temperature (25° C.), and the mixture was then heated to 150° C. with continued stirring for 3 hours, and then cooled, yielding a silicone rubber base.

To 130 parts by mass of this silicone rubber base was added 60 parts by mass of a dimethylpolysiloxane with both molecular chain terminals blocked with dimethylvinylsiloxy groups and with a viscosity at 25° C. of 100 Pa·s (average polymerization degree: approximately 1,000) (component (A)), and following stirring for 30 minutes, 2.0 parts by mass of a methylhydrogenpolysiloxane containing SiH groups at both molecular chain terminals and non-terminal positions [viscosity at 25° C.: 0.011 Pa·s, polymerization degree: 20, SiH group content: 0.0050 mol/g] (component (B)) as a crosslinking agent [(SiH groups within component (B))/(alkenyl groups bonded to silicon atoms within component (A))=2.2 mol/mol], 0.10 parts by mass of ethynylcyclohexanol as a reaction retarder, and 0.1 parts by mass of a platinum catalyst (Pt concentration: 1% by mass) were added to the mixture, and stirring was continued for a further 15 minutes, thereby yielding a silicone rubber composition 5.

Using the cone and plate measurement jig of a high-precision rotational viscometer (manufactured by Haake Corporation), the viscosity of this silicone rubber composition 5 at 23° C. was measured at shear velocities of 0.9 s$^{-1}$, 100 s$^{-1}$, and 200 s$^{-1}$. The results are shown in Table 2.

In addition, the silicone rubber composition 5 was separated into two liquids, which were then placed in separate material pumps within a two-color injection molding device. Subsequently, using a mold that enabled the molding of four molded nipples, injection molding was conducted under the same conditions as those described above, thus preparing a series of molded nipple items (cured products). These molded nipple items were inspected for the presence of burrs. The results are shown in Table 3.

Comparative Examples 4 and 5

With the exception of further adding either 1 part by mass (the comparative example 4) or 2 parts by mass (the comparative example 5) of a polyoxyethylene polyoxypropylene monobutyl ether with a viscosity at 25° C. of 0.27 Pa·s (hydroxy value: 9.6×10$^{-4}$ mol/g), silicone rubber compositions 6 and 7 were prepared in the same manner as the comparative example 3, and the viscosities of the compositions were then measured, and inspections were conducted for the presence of burrs within the molded nipple items in the same manner as the comparative example 3. The results are shown in Tables 2 and 3.

TABLE 2

|  | Comparative example 3 Silicone rubber composition 5 | Comparative example 4 Silicone rubber composition 6 | Comparative example 5 Silicone rubber composition 7 |
|---|---|---|---|
| Viscosity (Pa · s) at shear velocity of 0.9 s$^{-1}$ | 340 | 1210 | 1150 |
| Viscosity (Pa · s) at shear velocity of 100 s$^{-1}$ | 62 | 76 | 66 |
| Viscosity (Pa · s) at shear velocity of 200 s$^{-1}$ | 9 | 20 | 18 |
| Ratio between viscosity at shear velocity of 100 s$^{-1}$ and viscosity at shear velocity of 200 s$^{-1}$ | 6.9 | 3.8 | 3.7 |

TABLE 3

| | Comparative example 3 Silicone rubber composition 5 | Comparative example 4 Silicone rubber composition 6 | Comparative example 5 Silicone rubber composition 7 |
|---|---|---|---|
| Presence of burrs on molded nipple items | Yes | Yes | Yes |

What is claimed is:

1. A method of injection molding a silicone rubber composition, comprising:
    filling a mold by injection of at least one addition curable liquid silicone rubber composition into said mold, said composition comprising:
    (A) 100 parts by mass of an organopolysiloxane containing at least two alkenyl groups bonded to silicon atoms within each molecule and having a viscosity at 25° C. within a range of 0.1 to 100 Pa·s,
    (B) an organohydrogenpolysiloxane containing at least two hydrogen atoms bonded to silicon atoms within each molecule and having a viscosity at 25° C. within a range from 0.0001 to 5 Pa·s, in sufficient quantity to provide from 0.4 to 5.0 hydrogen atoms bonded to silicon atoms within said component (B) for each alkenyl group bonded to a silicon atom within said component (A),
    (C) from 10 to 40 parts by mass of at least one fumed silica with a specific surface area measured by a BET method of 50 m$^2$/g or greater,
    (D) an effective quantity of at least one addition reaction catalyst, and
    (E) from 0.1 to 10 parts by mass of a straight-chain diorganopolysiloxane containing at least one hydroxyl group bonded to a silicon atom within each molecule, with a viscosity at 25° C. within a range from 0.001 to 3 Pa·s, and a hydroxyl number within a range from $1.0 \times 10^{-2}$ to $0.5 \times 10^{-2}$ mol/g,
and exhibiting fluidity such that, at 23° C., a viscosity at a shear velocity of 0.9 s$^{-1}$ is not higher than 1,000 Pa·s, and a ratio between a viscosity at a shear velocity of 100 s$^{-1}$ and a viscosity at a shear velocity of 200 s$^{-1}$ is not higher than 3.5; and
    curing said composition present in said mold,
    wherein a number of hydroxyl groups within a hydroxyl group-containing straight-chain diorganopolysiloxane of said component (E), relative to a total surface area of said fumed silica of said component (C), is within a range from $1.5 \times 10^{-8}$ to $2.0 \times 10^{-6}$ mol/m$^2$.

2. The method according to claim 1, further comprising heating said mold to a temperature of from 100 to 200° C. during said filling.

3. The method according to claim 1, further comprising heating said mold to a temperature of from 120 to 200° C. during said filling.

4. The method according to claim 1, further comprising heating said mold to a temperature of from 150 to 200° C. during said filling.

5. The method according to claim 1, further comprising heating said composition to a temperature of from 80 to 220° C. for a period of from 3 seconds to 10 minutes.

6. The method according to claim 1, further comprising heating said composition to a temperature of from 120 to 200° C. for a period of from 5 seconds to 3 minutes.

7. The method according to claim 1, wherein said at least one organopolysiloxane is represented by average composition formula (1):

$$R_a SiO_{(4-a)/2} \quad (1)$$

wherein,
    each R represents, independently, an unsubstituted or substituted monovalent hydrocarbon group, and
    a represents a number within a range from 1.9 to 2.4.

8. The method according to claim 1, wherein said at least one organopolysiloxane is at least one of

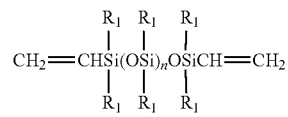

wherein, n is either 0 or an integer of 1 or greater, which is selected so as to satisfy the viscosity range of 0.1 to 100 Pa·s at 25° C., and each $R_1$ is, independently, a methyl group, an ethyl group, a propyl group, an isopropyl group, a butyl group, an isobutyl group, a tert-butyl group, a hexyl group, a cyclohexyl group, a phenyl group, a tolyl group, or a xylyl group;

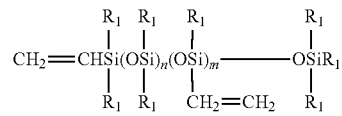

wherein, n is either 0 or an integer of 1 or greater, m is an integer of 1 or greater, and n+m is a number that satisfies the viscosity range of 0.1 to 100 Pa·s at 25° C., and each $R_1$ is, independently, a methyl group, an ethyl group, a propyl group, an isopropyl group, a butyl group, an isobutyl group, a tert-butyl group, a hexyl group, a cyclohexyl group, a phenyl group, a tolyl group, or a xylyl group;

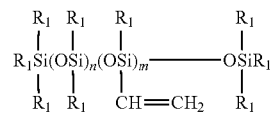

wherein, n is either 0 or an integer of 1 or greater, m is an integer of 1 or greater, and n+m is a number that satisfies the viscosity range of 0.1 to 100 Pa·s at 25° C., and each $R_1$ is, independently, a methyl group, an ethyl group, a propyl group, an isopropyl group, a butyl group, an isobutyl group, a tert-butyl group, a hexyl group, a cyclohexyl group, a phenyl group, a tolyl group, or a xylyl group; and

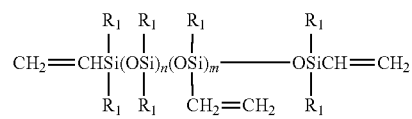

wherein, n is either 0 or an integer of 1 or greater, m is an integer of 1 or greater, and n+m is a number that satisfies the viscosity range of 0.1 to 100 Pa·s at 25° C., and each $R_1$ is, independently, a methyl group, an ethyl group, a propyl group, an isopropyl group, a butyl group, an isobutyl group, a tert-butyl group, a hexyl group, a cyclohexyl group, a phenyl group, a tolyl group, or a xylyl group.

9. The method according to claim 1, wherein said at least one organohydrogenpolysiloxane is represented by average composition formula (2)

$$R_b H_c SiO_{(4-b-c)/2} \qquad (2)$$

wherein,
each R represents, independently, an unsubstituted or substituted monovalent hydrocarbon group,
b represents a number from 0.7 to 2.1,
c represents a number from 0.001 to 1.0, and
b+c represents a number within a range from 0.8 to 3.

10. The method according to claim 9, wherein each R group is independently selected from the group consisting of a methyl group, an ethyl group, a propyl group, an isopropyl group, a butyl group, an isobutyl group, a tert-butyl group, a hexyl group, a cyclohexyl group, a vinyl group, an allyl group, a propenyl group, an isopropenyl group, a butenyl group, a phenyl group, a tolyl group, a xylyl group, a benzyl group, a 3,3,3-trifluoropropyl group, and a cyanoethyl group.

11. The method according to claim 1, wherein said at least one addition reaction catalyst is at least one member selected from the group consisting platinum black, platinic chloride, chloroplatinic acid, a reaction product of chloroplatinic acid and a monovalent alcohol, a complex of chloroplatinic acid and an olefin, platinum bisacetoacetate, a palladium catalyst, and a rhodium catalyst.

12. The method according to claim 1, wherein said at least one addition reaction catalyst is present in an amount of from 0.5 to 1,000 ppm relative to the mass of said at least one organopolysiloxane.

13. The method according to claim 1,
further comprising heating said mold to a temperature of from 100 to 200° C. during said filling; and
heating said composition to a temperature of from 80 to 220° C. for a period of from 3 seconds to 10 minutes.

14. The method according to claim 1, wherein the number of hydroxyl groups within a hydroxyl group-containing straight-chain diorganopolysiloxane of said component (E), relative to a total surface area of said fumed silica of said component (C), is within a range from $1.5 \times 10^{-8}$ to $1.8 \times 10^{-6}$ mol/m$^2$.

15. The method according to claim 1, wherein the number of hydroxyl groups within a hydroxyl group-containing straight-chain diorganopolysiloxane of said component (E), relative to a total surface area of said fumed silica of said component (C), is not less than $4.2 \times 10^{-7}$ mol/m$^2$.

16. The method according to claim 1, wherein the number of hydroxyl groups within a hydroxyl group-containing straight-chain diorganopolysiloxane of said component (E), relative to a total surface area of said fumed silica of said component (C), is from $4.2 \times 10^{-7}$ to $2.0 \times 10^{-6}$ mol/m$^2$.

17. The method according to claim 1, wherein the composition exhibits fluidity such that, at 23° C., a viscosity at a shear velocity of 0.9 s$^{-1}$ is not higher than 1,000 Pa·s, and a ratio between a viscosity at a shear velocity of 100 s$^{-1}$ and a viscosity at a shear velocity of 200 s$^{-1}$ is not higher than 3.1.

* * * * *